Sept. 3, 1968

F. S. MALICK 3,399,742

POWERED UNICYCLE

Filed June 23, 1966

INVENTOR
FRANKLIN S. MALICK
BY
ATTORNEY

Sept. 3, 1968        F. S. MALICK        3,399,742

POWERED UNICYCLE

Filed June 23, 1966        3 Sheets-Sheet 3

INVENTOR
FRANKIN S. MALICK
BY
ATTORNEY

United States Patent Office 3,399,742
Patented Sept. 3, 1968

3,399,742
POWERED UNICYCLE
Franklin S. Malick, 518 Greenleaf Drive,
Monroeville, Pa. 15146
Filed June 23, 1966, Ser. No. 559,842
7 Claims. (Cl. 180—21)

ABSTRACT OF THE DISCLOSURE

This patent discloses a powered unicycle controlled by a first transducer comprising either a hand-held potentiometer or a vertical-sensing gyroscope, cooperating with second and/or third transducer means comprising, respectively, wheel-associated tachometer means and/or gyroscope means sensing the rate of change of angle of the unicycle with respect to the vertical. Through fast-acting electronic control circuitry, the above transducers quickly apply powerful accelerating or braking torque, as required, to the wheel, affording a vehicle that is more readily mastered and/or gives a more sporting ride than known unicycles pumped by the rider and/or stabilized by gyroscopes themselves providing forces to prevent changes in the attitude of the vehicle.

---

This invention relates to vehicles of the type having a single supporting and driving wheel, known as unicycles, and more particularly to power means and control means for vehicles of this type, arranged to be operated by a rider for driving and braking said vehicle as well as maintaining balance thereof.

Although not limited thereto, the drive means and the control means of the present invention are particularly adapted for use on a one-wheeled vehicle commonly known as a unicycle. As is known, unicycles support a rider who, after acquiring the necessary skill, is able to balance the vehicle while moving forward, turning, accelerating, decelerating and braking to a dead stop.

Prior art unicycles are powered by the rider through conventional foot pedals which are connected to the single supporting wheel. The circular motion of the feet required to transmit torque to the single supporting wheel, adds considerably to the problem of maintaining balance. Consequently, long hours of intense practice are required to obtain the necessary balance in riding a unicycle. Also, riding a conventional unicycle is very tiring and the speed and accelerations which can be obtained are low, thereby limiting the thrill of riding.

Accordingly, as an overall object, the present invention seeks to provide an engine driven one-wheeled vehicle that can be easily controlled by the rider to maintain balance.

Another object of the invention is to provide an engine driven one-wheeled vehicle provided with means for enabling the rider to quickly learn to operate the vehicle without falling off and without the vehicle falling to the ground.

Another object of the invention is to provide an engine driven one-wheeled vehicle which may be readily balanced by the rider without the use of a gyroscope of the type which resists changes in the attitude of the vehicle.

A further object of the invention is to provide an engine driven one-wheeled vehicle with rapid acceleration and braking and high maneuverability to provide a sporting ride.

Still another object of the invention is to provide an engine driven one-wheeled vehicle in which the driving and braking torque are controlled by the rider from a single manually operated linear motion or pressure actuated proportional controller.

Still another object of the invention is to provide an engine driven one-wheeled vehicle which is of small size and light weight such that it may easily be handled by the rider, and yet is rugged and sturdy and is capable of withstanding abusive treatment without damage.

In accordance with the present invention, a vehicle of the unicycle type is provided having a seat secured to a fork which, in turn, has a single wheel of the pneumatic type, journaled thereto. Operatively connected to the axle of the single wheel are an electromagnetic brake, operable to apply a braking torque, and an electromagnetic clutch, operable to apply an accelerating or driving torque, to the single wheel. Power is supplied to the single wheel by means of a conventional gasoline engine through a chain drive operatively connected to the armature of the electromagnetic clutch. A rate sensing gyroscope is carried on the vehicle and, as will be described, serves to produce an electrical signal in proportion to the angular rate of change of the vehicle from the vertical. The present vehicle is also provided with a tachometer which measures the actual velocity of the single supporting wheel.

In accordance with one embodiment of the invention, the electromagnetic brake, the electromagnetic clutch, and the tachometer are interconnected by circuit means of the invention, such that their operation is controlled by the rider through a single manually operated linear motion or pressure actuated proportional controller. Briefly, the circuit means of the invention is such that the desired speed, as set by the rider through the manually operated proportional controller, is compared with the actual speed of the vehicle as determined by the tachometer, to arrive at a voltage of predetermined polarity, which further by the circuit means varies the current in the windings of both the electromagnetic brake and the electromagnetic clutch. Should the desired speed be greater than the actual speed of the vehicle, the current in the windings of the electromagnetic clutch increases such that additional torque is applied to the wheel to accelerate the vehicle to the desired speed. Conversely, if the desired speed is less than the actual speed of the vehicle, the current in the windings of the electromagnetic brake is increased to decelerate the vehicle to the desired speed. It should be noted at this time that the speed desired by the rider is something more than just a velocity over the ground. Should the rider begin to fall forward, he will automatically desire an increase in wheel speed to drive the wheel under his center of gravity. Thus, in addition to mere velocity over the ground, the rider will desire an increase or a decrease in speed, as is necessary, to stay balanced.

In accordance with another embodiment of the invention, the manually operated proportional controller and the rate sensing gyroscope provide additive control signals to the circuit means for operating the electromagnetic clutch and brake. In this embodiment, the rate sensing gyroscope provides a control signal which is proportional to the angular rate at which the vehicle falls either in a forward or backward direction. In essence, the rate sensing gyroscope aids the rider in his manual operation of the brake or clutch in response to the forward or backward falling of the vehicle, to bring the vehicle to an upright position.

In accordance with still another embodiment of the invention, the tachometer and a vertical sensing gyroscope provide signals in opposing relation to the circuit means for controlling the operation of the brake and clutch. The manually operated proportional controller is not used in this embodiment. The rider accelerates the vehicle by inclining his body in a forward direction, that is, away from the vertical, and decelerates the vehicle by inclining his body in a backward direction.

In still another embodiment of the invention, the manually operated proportional controller and the rate sensing gyroscope are combined to provide a control signal opposing the tachometer to generate a control signal applied to the circuit means for operating the brake and clutch. Operation of the vehicle is substantially the same as the operation of the vehicle wherein only the manually operated proportional controller and the tachometer were employed. However, in this embodiment, the rate sensing gyroscope aids the rider by applying signals to correct the attitude of the vehicle much faster than the operator could simply by employing the manually operated proportional controller.

The above and other objects and advantages of the present invention will become apparent from the following detailed description by reference to the accompanying drawings, in which.

Figure 1:
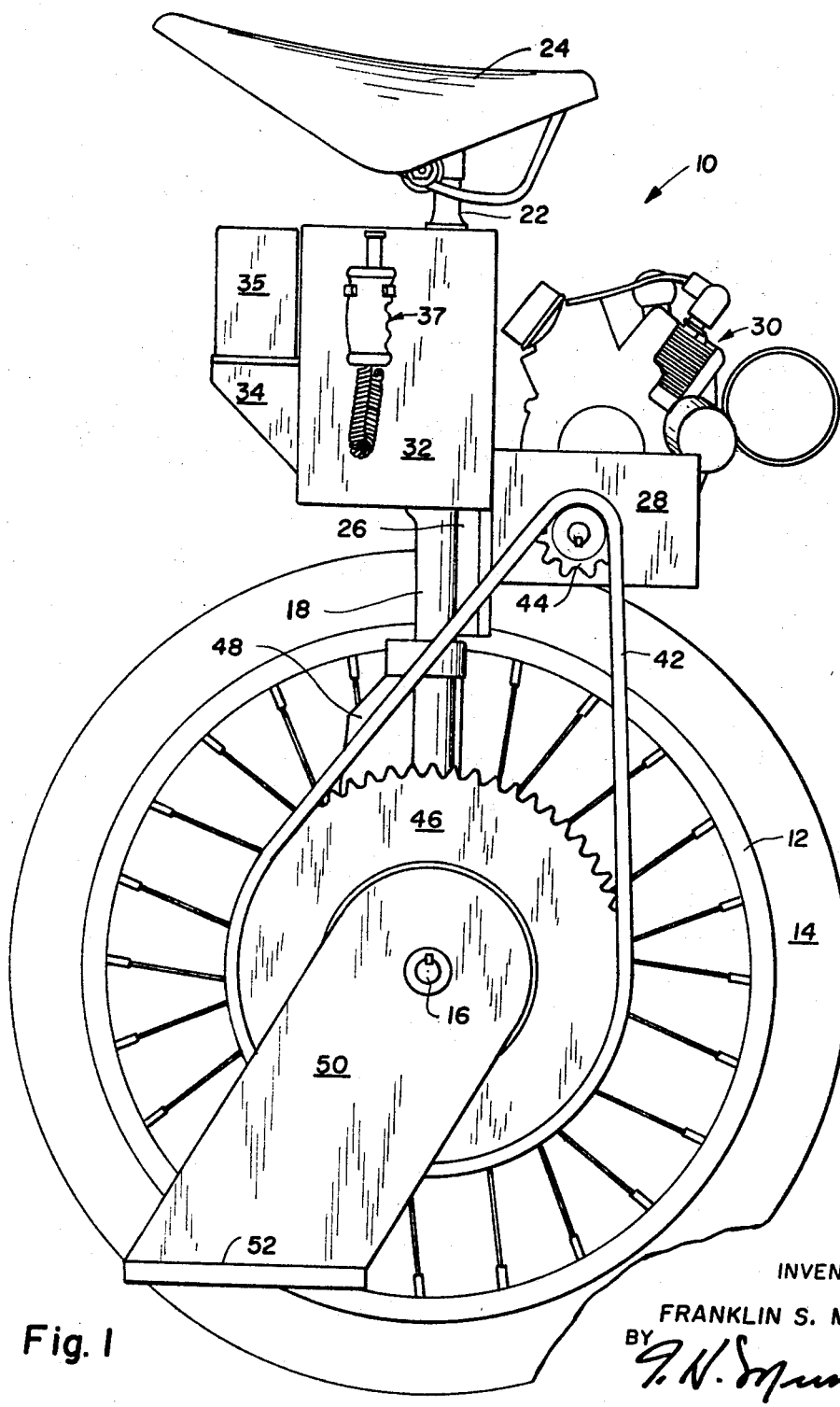
FIGURE 1 is a side view of the left side of the present vehicle.
Figure 2:
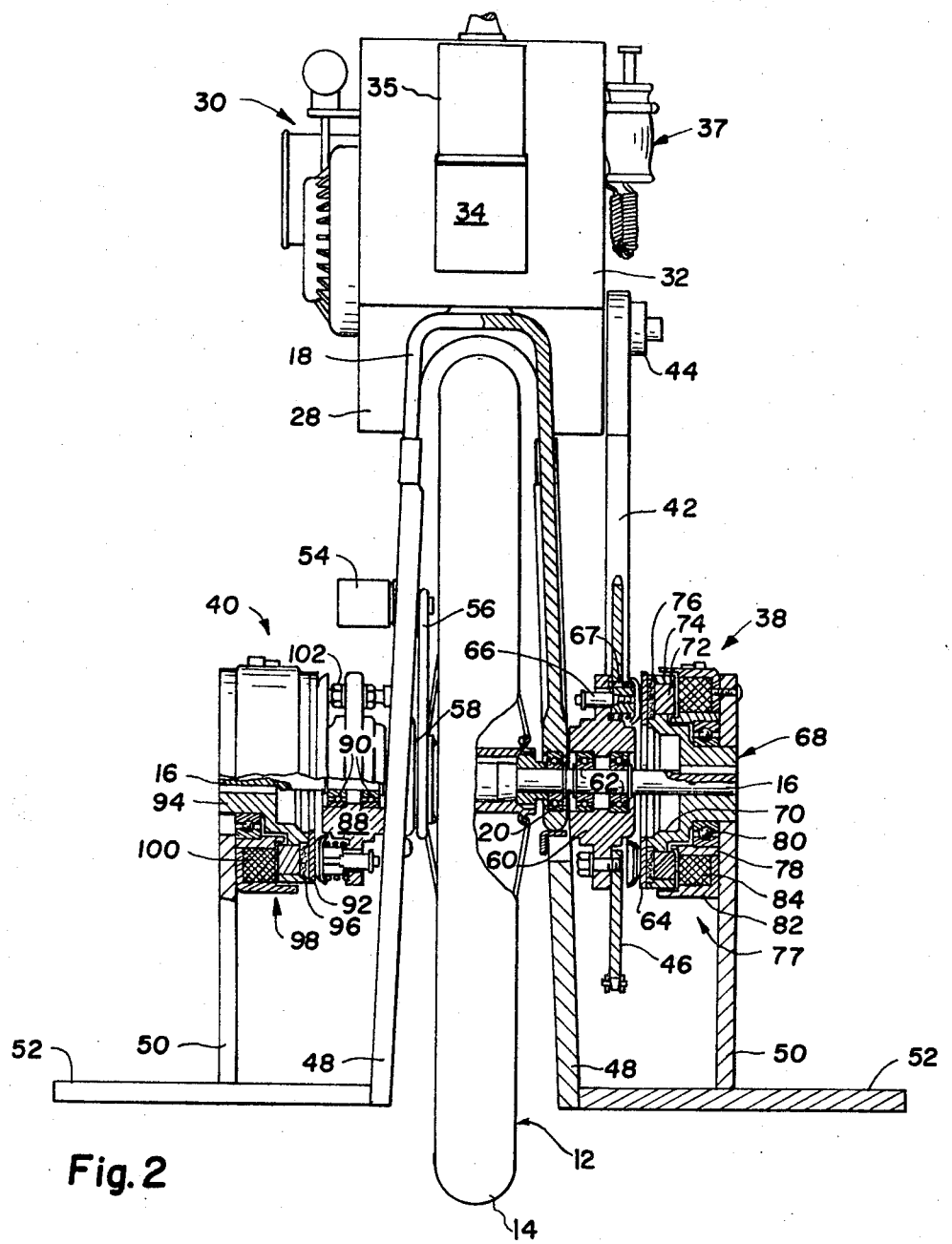
FIG. 2 is a front view of the present vehicle with portions thereof in section to illustrate details.

Referring now to FIGS. 1 and 2, there is illustrated a vehicle 10 constructed in accordance with the principles of the present invention and shown comprising a single wheel 12 mounting a pneumatic tire 14. The single wheel 12 is keyed to a shaft 16 which extends outwardly beyond each side of the wheel 12. A fork 18 is rotatably connected to the shaft 16 by means of journals 20 (only one shown) and includes a post 22 projecting thereabove and supporting a seat 24. Secured to the upper end of the fork 18 is a platform 26 on which is mounted an engine bracket 28 supporting a gasoline engine 30 having an integral gear box. A housing 32 is also supported on the platform 26 and contains the electrical control circuitry and the batteries which provide the required electrical power. A bracket 34 is attached to the front of the housing 32 and supports a rate sensing gyroscope or vertical sensing gyroscope contained in a hermetically sealed can 35. A transducer means comprising a hand held and hand controlled potentiometer 37 is clipped or otherwise temporarily connected to the housing 32.

As stated, the axle 16 projects beyond either side of the fork 18 and supports an electromagnetic clutch assembly 38 on the left side of the vehicle 10 and an electromagnetic brake assembly 40 on the right side of the vehicle 10. Power is brought to the clutch assembly 38 by a drive chain 42 which is engaged in driving relation with a drive sprocket 44 connected to the engine output shaft and a driven sprocket 46 which is connected to the clutch assembly 38 in a manner to be described.

Secured to each of the two sides of the fork 18 is an inner brace member 48. Two outer brace members 50 are provided, one attached to the clutch assembly 38 and the other attached to the brake assembly 40. The inner and outer brace members 48, 50 cooperate to support footboards 52, one on each side of the vehicle 10.

Mounted on one of the inner brace members 48 is a transducer means comprising a small direct current tachometer 54 which is driven by a belt 56 engaged with a pulley 58 mounted, for example, on the hub of the wheel 12. The tachometer 54 being connected directly to the wheel 12 measures the actual velocity of the vehicle 10 and emits an electrical signal proportional thereto.

Referring now in particular to FIG. 2, the electromagnetic clutch assembly 38 includes an armature hub 60 rotatably supported on the axle 16 by journals 62. The aforementioned driven sprocket 46 is secured to the armature hub 60 whereby the armature hub 60 is rotated continuously by the drive chain 42. A soft steel armature plate 64 is supported in concentric relation with the armature hub 60 by driving pins 66. The driving pins 66 are slideably supported in the armature hub 60 and are biased by springs 67 away from the armature hub 60 as the soft steel armature plate 64 wears.

The clutch assembly 38 also includes a rotor 68 which is keyed to the shaft 16 for rotation therewith. The rotor 68 comprises a soft steel rotor hub 70 carrying a nonmagnetic spacer ring 72 which, in turn, carries a soft steel annular rim 74. An annular ring 76 of asbestos base friction material is interposed between the rotor hub 70 and the annular rim 74 and supported thereby for frictional engagement with the soft steel armature plate 64.

The clutch assembly 38 also includes a coil housing 77 comprising a soft steel inner ring member 78 carried on journal 80 and cooperating with a second soft steel member 82 to support the clutch coil or winding means 84. The coil housing 77 is secured to the outer brace member 50 and, hence, the clutch coil 84 is stationary.

In operation, excitation of the clutch coil 84 creates magnetic flux which passes through the soft steel members 82, 74, 64, 70 and 78, thereby creating a force which drives the rotating armature plate 64 into frictional engagement with the face of the annular ring 76 and thereby develops a frictional driving torque. A frictional driving torque is transmitted through the axle 16 to the wheel 12. As will be described, the frictional driving torque is varied by varying the current in the clutch coil 84.

The brake assembly 40 is identical in construction with the clutch assembly 38 and includes an armature hub 88 carried on journals 90 and supporting an armature plate 92, a rotor 94 keyed to the shaft 16 and supporting an annular friction ring 96 for engagement by the armature plate 92, and a coil housing 98 secured to the outer brace member 50 and containing brake coil or windings means 100. The brake assembly 40 differs from the clutch assembly 38 in that the armature plate 92 is anchored to the fork 18 by means of a bolt 102. Thus, excitation of the brake coil 100 will cause the brake armature plate 92 to be drawn against the frictional ring 96 of the rotor 94 to produce a frictional braking force torque which is transmitted from the axle 16 to the wheel 12. As will be described, this frictional braking torque is varied by varying the current in the brake coil 100.

*Velocity feedback balance stabilization*

Figure 3:
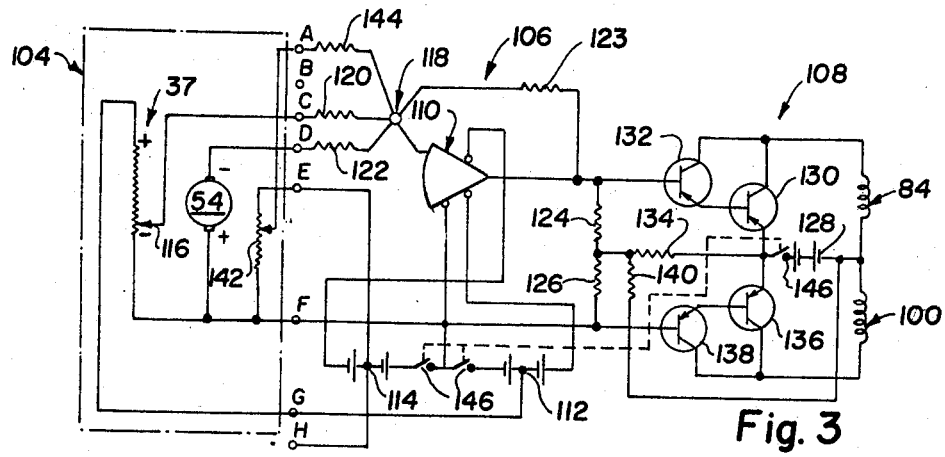
FIG. 3 is a schematic diagram of a first control circuit suitable for controlling the operation of the present vehicle.

Referring now to FIG. 3, there is illustrated a control circuit suitable for controlling the operation of the vehicle 10. The circuit shown in FIG. 3 is used for velocity feedback balance stabilization wherein the hand-held potentiometer 37 and the tachometer 54 are used to produce control signals in opposing relation. The rate sensing gyroscope, which is contained in the can 35 and has, as hereinafter mentioned a pickoff potentiometer 36, is not used in this circuit.

The signal input circuit is bounded by a heavy dash-dot outline and indicated by the numeral 104. The remainder of the control circuit consists of two parts, namely, a signal summing amplifier circuit indicated generally at 106 and a power amplifier indicated generally at 108 which supplies current to the clutch and brake winding means 84, 100, respectively.

The signal summing circuit 106 includes eight input terminals, indicated by the open circles labeled A through H. The signal summing circuit 106 also includes a solid-state operational amplifier 110 of conventional design, which receives power at +15 volts from a battery 112 and at −15 volts from a battery 114. A tap at 6 volts on the battery 112 provides excitation for the linear motion potentiometer 37 through terminal G. The output signal voltage from a sliding tap 116 of the potentiometer 37 is applied to a summing junction 118 of the operational amplifier 110 through terminal C and an input resistor 120. The output signal from the direct current tachometer 54 is applied to the summing junction 118 of the operational amplifier 110 through terminal D and an input resistor 122. A resistor 123 is the feedback resistor. The output voltage of the operational amplifier 110 appearing across voltage dividing resistors 124 and 126 is the algebraic sum of the signal voltages as determined by the following relationship.

Output voltage = [potentiometer 37 voltage × R123 ÷ R120] + [tachometer voltage × R123 ÷ R122] + [potentiometer 142 voltage × R123 ÷ R144]

The tachometer output has the polarity shown for forward motion of the vehicle. The sliding tap 116 on the potentiometer 37 is at the negative voltage position when the thumb actuated plunger is in its full-out position and at the positive voltage position when in a fully depressed position.

The current from a wet cell battery 128, in the power amplifier circuit 108, passes through the clutch winding means 84 and is controlled in magnitude by the power transistor 130. The clutch winding means current will increase as the input voltage applied to the base of an input transistor 132 becomes more negative. This voltage is made up of the voltage developed across resistor 124 by the output of the operational amplifier 110 and a negative bias voltage which is developed across a resistor 134. This bias voltage is selected to provide a clutch and brake current flow of about 20% of maximum when the operational amplifier output voltage is zero. The current in the brake winding means 100 is controlled in the same manner by a power transistor 136 and an input transistor 138 in response to that portion of the operational amplifier voltage which appears across the resistor 126 and the bias voltage developed across resistor 134. The output of the operational amplifier 110 appearing across the voltage divider made up of equal resistors 124 and 126 causes the clutch current to increase above the bias current at the same time the current to the brake winding means 100 decreases below the bias current. A reversal of the polarity of the output voltage of the operational amplifier 110 causes the current to the clutch windings 84 to decrease as the current to the brake windings 100 increases. By proper selection of the bias voltage, using the voltage dividing resistors 134, 140, the net torque applied to the wheel by the clutch and brake assemblies can be made nearly proportional to the output of the operational amplifier 110 from the maximum torque capability of the brake assembly to the maximum torque capability of the clutch assembly. A zero output from the operational amplifier 110 produces a net torque of zero applied to the wheel.

The signal input circuit 104 includes a potentiometer 142 which applies a negative bias signal voltage to the summing junction 118 through terminal A and resistor 144. The negative bias signal voltage causes excitation of the brake winding means 100 and therefore causes the brake to be applied when the vehicle is standing still, that is, when the hand control plunger is fully out.

When the rider is ready to move, he depresses the plunger on the hand control, thus moving the tap 116 on the potentiometer 37 to apply a positive voltage to the summing junction 118, cancelling out the negative bias voltage from the potentiometer 142, and thereby releasing the brake. Further depression of the hand control plunger causes a net driving torque to be applied to the wheel. As the vehicle begins to move, the tachometer negative voltage increases and cancels out most of the effect of the positive voltage from the hand potentiometer 37. The net positive voltage effect which remains is that amount needed to develop the net torque needed to accelerate the vehicle or to overcome any resistance to the forward motion thereof. Thus, the hand control is a speed demand control. The further the control plunger is depressed, the faster the vehicle will be driven.

The tachometer 54 indicates actual velocity of the wheel. When the measured velocity is less than the demand velocity, as set by the position of the sliding tap 116, a velocity error exists. This velocity error causes a net driving torque to be developed to increase the speed. Likewise, when the measured velocity is greater than the demand velocity, as would be the case when the rider wishes to slow down, then the velocity error reverses in polarity and causes a net braking torque to be developed to slow the vehicle. In order to provide a vehicle which the rider can balance, the overall gain of the velocity control must be very high, i.e., a small error will cause a large corrective torque to be applied.

Referring now to FIGS. 1–3, inclusive, the vehicle as described is operated by the rider in the following manner. With the hand control 37 in the full-out position, the rider operates ganged main on and off switches 146 which apply power from the batteries 112, 114 and 128 to the signal input circuit 104, the signal summing circuit 106 and the power amplifier circuit 108. This causes the brake to be applied. With the brake applied, the vehicle 10 is easily held in the upright position. The rider then starts the engine 30. Since the brake assembly 40 is operating, the clutch assembly 38 is producing very little torque and the engine 30 is started without a load. The rider then straddles the seat 24 and places his heels on the footboards 52 with his toes touching the ground. This "stop" position is stable because the wheel and the two toes provide three points of contact with the ground. The rider now takes the hand control 37. When he is ready to move, he gradually depresses the plunger deactivating the brake assembly 40 and activating the clutch assembly 38 to apply a driving torque to the wheel 12. At the same time he reduces the pressure of his toes on the ground so that they can slide along the ground and assist in maintaining balance as the vehicle 10 gets under way. The rider now begins to maintain balance by the use of the hand control 37. If he feels that is is falling forward, he depresses the plunger and calls for an increase in speed. The wheel 12 is driven under his center of gravity and the vehicle 10 and the rider are brought to an upright position. If the rider feels that he is falling backwards, he releases the plunger and thus calls for a reduced speed. This causes the brake assembly 40 to apply a braking torque, throwing the center of gravity forward over the wheel and again bringing the rider and the vehicle 10 to an upright position.

*Rate sensing gyroscope balance stabilization*

It will be noted that the signal input circuit 104 includes only the hand-held potentiometer 37 and the tachometer 54. It is possible to use the signal summing circuit 106 and the power amplifier circuit 108 in conjunction with the hand-held controller 37 and the rate sensing gyroscope 36, mentioned above, to arrive at rate gyroscope balance stabilization.

Figure 4:
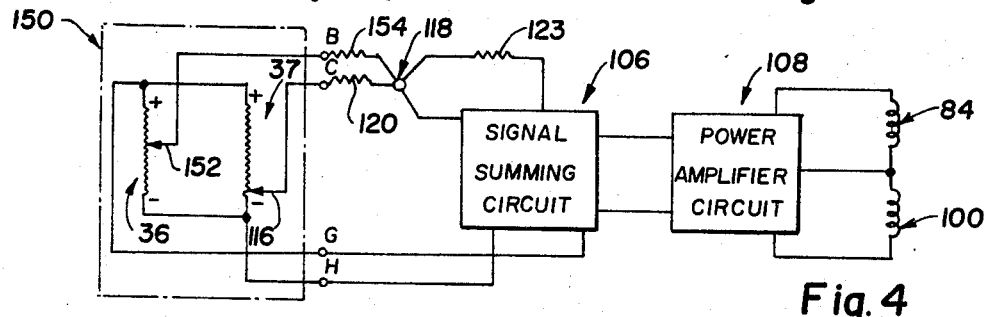
FIG. 4 is a schematic diagram of a second control circuit suitable for controlling the operation of the present invention.

Reference is now directed to FIG. 4 wherein the signal summing circuit 106 and the power amplifier circuit 108 are schematically illustrated. A signal input circuit, indicated generally at 150 includes one transducer means comprising the hand-held potentiometer 37 and another transducer means comprising the rate sensing gyroscope having a potentiometer 36, which is shown having sliding tap 152.

The potentiometer 37 receives current from terminals H and G and applies its control signal to the summing junction 118 through terminal C and resistor 120. The rate sensing gyroscope pickoff potentiometer 36 receives power also from terminals G and H and applies its control signal to the summing junction 118 through terminal B and a resistor 154. The hand-held controller potentiometer 37 and the gyroscope pickoff potentiometer 36 are arranged such that the control signals therefrom are additive.

It is to be noted that the positive end of the hand-held potentiometer 37 corresponds to the fully depressed position of the plunger, as in the velocity stabilization circuit 104. But, the full-out position of the plunger causes a negative voltage to be applied to the summing junction 118, thus applying full braking torque to the wheel 12. The halfway position of the plunger, that is, the sliding tap 116, applies zero voltage to the summing junction 118 so that the net torque is zero. Depressing the plunger past the midpoint causes a driving torque to be applied to the wheel 12.

The sliding tap 152 on the rate sensing gyroscope pickoff potentiometer 36 is centered when the vehicle angular rate is zero, that is, when the vehicle ie neither falling forward nor backward. Excitation voltage is applied to the rate sensing gyroscope pickoff potentiometer 36 so that a fall of the vehicle 10 in the forward direction will cause the sliding tap 152 to move toward the positive end of the rate sensing gyroscope potentiometer 36 causing a positive voltage to appear at the summing junction 118 and a driving torque to be applied to the wheel which is proportional to the amount of movement of the sliding tap 152. Conversely, a fall of the vehicle in a backward direction will cause the sliding tap 152 to move toward the negative end of the rate sensing gyroscope potentiometer 36 causing a negative voltage to appear at the summing junction 118 and a braking torque to be applied to the wheel which is proportional to the amount of movement of the sliding tap 152.

The vehicle 10, incorporating rate gyroscope balance stabilization, is started and mounted by the rider exactly as was described above for the velocity feedback balance stabilization. When the rider is ready to move, he gradually depresses the hand-held potentiometer 37. As the sliding tap 116 of the potentiometer 37 moves toward the midpoint of the potentiometer 37, the negative voltage applied to the summing junction 118 is decreased, thereby releasing the brake. As the sliding tap 116 moves past the midpoint of the potentiometer 37, a driving torque is applied to the wheel 12. Since the torque applied to the wheel is proportional to the movement of the sliding tap 116, that is, travel of the plunger, the hand control potentiometer 37 is an acceleration control and not a speed control. The rider causes the vehicle 10 to operate at the desired speed by removing the demand for acceleration when the desired speed is reached. Thus, a constant speed will be maintained with the sliding tap 116 in nearly the midpoint position.

The rider maintains balance of the vehicle 10 in exactly the same manner as with the velocity feedback stabilization described above in conjunction with the circuit of FIG. 3. That is, if he feels that he is falling forward, he depresses the plunger on the hand-held potentiometer 37 and calls for acceleration of the wheel 12. The wheel is driven under the center of gravity and the vehicle 10 and the rider are brought into upright position. If the rider feels that he is falling backward, he releases the plunger of the potentiometer 37 and calls for a deceleration, that is, a braking torque, to be applied to the wheel 12. This throws the center of gravity forward over the wheel 12 and brings the rider and the vehicle 10 to an upright position. The rate sensing gyroscope having the potentiometer 36 aids the rider by providing the torque required to maintain balance much faster than the rider is able to do so. The vehicle 10 cannot be balanced with the hand control potentiometer 37 alone, that is, without velocity feedback stabilization or rate gyroscope feedback stabilization.

*Vertical sensing gyroscope balance stabilization*

Figure 5:
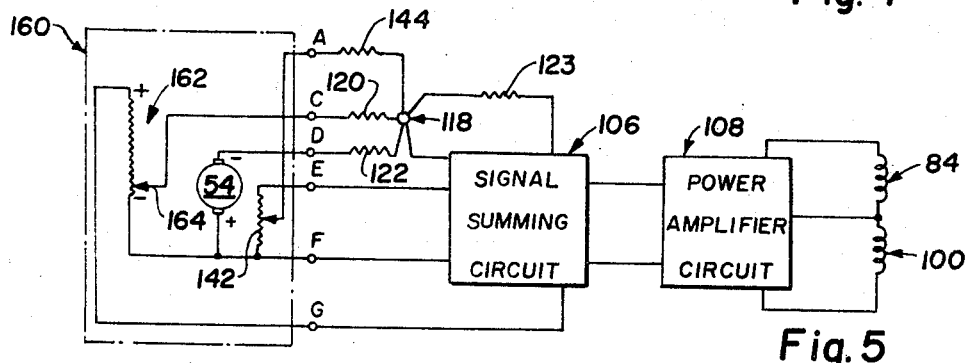
FIG. 5 is a schematic diagram of a third control circuit suitable for controlling the operation of the present invention.

Reference is now directed to FIG. 5 wherein a signal input circuit 160 is enclosed in a heavy dash-dot outline and comprises the tachometer 54 whose signal is applied to the summing junction 118 through terminal D and resistor 122, the voltage bias potentiometer 142 whose signal is applied through terminal A and resistor 144 to the summing junction 118 and a transducer means comprising a vertical sensing gyroscope pickoff potentiometer 162 including a sliding tap 164. The potentiometer 162 applies its signal to the summing junction 118 through terminal C and resistor 120. No hand control potentiometer is used in this method of balancing the vehicle 10. The sliding tap 164 of the gyroscope pickoff potentiometer 162 is at the negative position when the vehicle 10 is in a vertical position. Excitation voltage is applied to the pickoff potentiometer 162 so that inclination of the vehicle in a forward direction will cause the sliding tap 164 to move toward the positive end of the potentiometer 162 to cause a positive voltage to appear at the summing junction 118 and, hence, a driving torque to be applied to the wheel 12. System damping is provided by the transducer means comprising tachometer 54. It should be understood, however, that the system damping may be provided by lead or lag networks associated with the operational amplifier of the signal summing circuit 106, as is common in the servomechanism art.

The tachometer 54 produces a negative signal voltage which cancels out most of the effect of the positive voltage developed at the sliding tap 164 of the potentiometer 162. The net positive voltage effect which remains is that amount needed to develop the torque needed to accelerate the vehicle or to overcome any resistance to the forward motion. Thus, the further the vehicle leans forward from the vertical position, the faster the vehicle will be driven.

The vehicle 10 provided with vertical sensing gyroscope balancing, is ridden in a very different manner than that employed with either the velocity feedback balance stabilization described in conjunction with the circuit of FIG. 3 or the rate sensing gyroscope balance stabilization as described in conjunction with the circuit of FIG. 4. The rider operates the ganged main switches to apply power to the signal and power circuits with the vehicle 10 leaning slightly backwards. This causes the bias potentiometer 142 to apply a negative signal to the summing junction 118 and thence to apply voltage to the brake winding means 100, thereby applying a braking torque to the wheel 12. The rider then starts the engine, straddles the seat 24, and places his heels on the foot boards 52 with his toes on the ground. The rider must take care to see that the vehicle is slightly tilted in a backward direction. When he is ready to move, the rider brings the vehicle to a position forward of the vertical thereby actuating the vertical gyroscope pickoff potentiometer 162 to cause a positive signal to be applied to the summing junction 118 and thence activation of the clutch assembly to cause a driving torque to be applied to the wheel 12. As before, the rider gradually reduces the pressure of his toes on the ground so that they can slide along on the ground to assist in maintaining balance as the vehicle gets under way. The rider no longer has to maintain a vertical balance because the vertical sensing gyroscope does this; however, the rider must determine how fast he wants to go. He does this by shifting his weight. If he leans forward, the vehicle must increase speed to keep from falling forward. If he leans backward, the vehicle must brake to keep from falling backward just as in the two previously described methods of balance stabilization where the rider provided the vertical sensing. Thus, with the vertical gyro balancing, the speed of the vehicle is controlled by the rider shifting his weight fore and aft instead of by a hand control. Accordingly, the further forward the rider leans the vehicle, the faster the vehicle will be driven.

*Combined velocity and rate sensing gyroscope balance stabilization*

Figure 6:
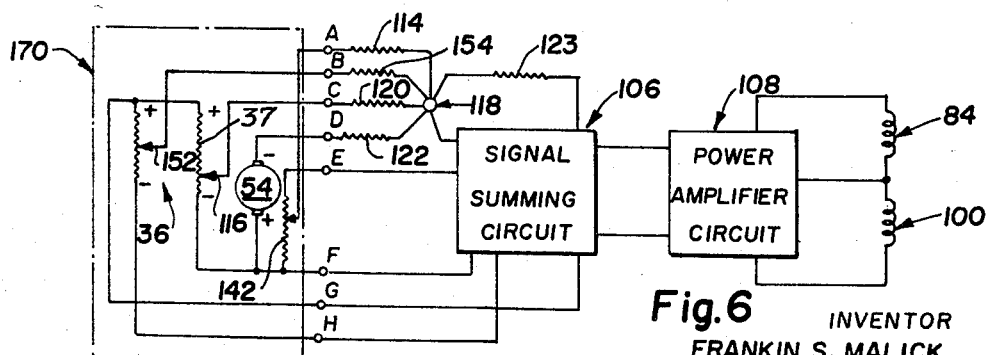
FIG. 6 is a schematic diagram of a fourth control circuit suitable for controlling the operation of the present invention.

Reference is now directed to FIG. 6 wherein there is illustrated a control circuit incorporating a signal input circuit 170 which includes the rate sensing gyroscope pickoff potentiometer 36, the hand control potentiometer 37, the tachometer 54 and the bias potentiometer 142. The vehicle 10, when provided with the signal input circuit 170, is easier to ride than a vehicle provided with tachometer or rate gyro stabilization alone. The hand control potentiometer 37 is again a speed control whose signal is presented in opposition with the signal from the tachometer 54. As described, the rate sensing gyroscope potentiometer 36 aids the rider in balancing the vehicle by providing the torque required to maintain balance much faster than the rider is able to do so.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a power driven unicycle, the combination comprising:
   a single supporting and driving wheel;
   electromagnetic clutch means for applying a driving torque to said single wheel, including clutch energizing winding means, a continuously rotating driving member, and a driven member connected in torque transmitting relation with said single wheel;
   electromagnetic brake means for applying braking torque to said single wheel, including brake energizing winding means, a rotating member connected to said single wheel, and a stationary member;
   first transducer means actuated by a rider for providing a first electrical signal proportional to desired wheel velocity;
   second transducer means associated with said single wheel for providing a second electrical signal proportional to actual wheel velocity;
   circuit means for combining said first and second electrical signals to produce a control signal; and
   means responsive to said control signal for varying the currents to said clutch energizing winding means and said brake energizing winding means.

2. The combination as defined in claim 1 wherein said circuit means includes an electronic amplifier means responsive to said control signal.

3. The combination as defined in claim 1 including third transducer means actuated by the tilting of said vehicle for providing a third electrical signal which is proportional to the forward and backward angular velocity of said vehicle, said circuit means combining said third electrical signal in additive relationship with said first electrcal signal and in opposing relationship with said second electrical signal.

4. The combination as defined in claim 1 including means for providing a bias voltage to said circuit means for energizing said brake energizing winding means when said vehicle is stationary, said bias voltage being in opposing relation with said first electrical signal.

5. The combination as defined in claim 1 including third transducer means actuated by the tilting of said vehicle for providing a third electrical signal proportional to the forward and backward angular velocity of said vehicle, said circuit means combining said third electrical signal in additive relationship with said first electrical signal and in opposing relationship with said second electrical signal, and including further means for providing a bias voltage to said circuit means for energizing said brake energizing winding means when said vehicle is stationary, said bias voltage being in opposing relationship with said first electrical signal.

6. In a power driven unicycle, the combination comprising:
   a single supporting and driving wheel;
   electromagnetic clutch means for applying a driving torque to said single wheel, including clutch energizing winding means, a continuously rotating driving member, and a driven member connected in torque transmitting relation with said single wheel;
   electromagnetic brake means for applying braking torque to said single wheel, including brake energizing winding means, a rotating member connected to said single wheel, and a stationary member;
   first transducer means actuated by a rider for providing a first electrical signal proportional to desired wheel torque;
   second transducer means actuated by the tilting of said vehicle for providing a second electrical signal proportional to the forward and backward angular velocity of said vehicle;
   circuit means for combining said first and second electrical signals to produce a control signal; and
   means responsive to said control signal for varying the currents to said clutch energizing winding means and said brake energizing winding means.

7. In a power-driven unicycle, the combination comprising:
   a single supporting and driving wheel;
   electromagnetic clutch means for applying a driving torque to said wheel, including a clutch energizing winding means, a continuously rotating driving member, and a driven member connected in torque-transmitting relationship with said single wheel;
   electromagnetic brake means for applying braking torque to said single wheel, including brake energizing winding means, a rotating member connected to said single wheel, and stationary member;
   first transducer means comprising a vertical-sensing gyroscope for providing a first electrical signal proportionate to the attitude of said unicycle with respect to the vertical;
   second transducer means associated with said single wheel for providing a second electrical signal proportional to actual wheel velocity;
   circuit means for combining said first and second electrical signals to produce a control signal; and
   means responsive to said control signal for varying the currents to said clutch energizing winding means and said brake energizing winding means.

References Cited

UNITED STATES PATENTS

| | | | |
|---|---|---|---|
| 1,236,030 | 8/1917 | Wilson | 180—21 |
| 3,083,036 | 3/1963 | Cornell et al. | 280—205 |

FOREIGN PATENTS

| | | |
|---|---|---|
| 4,137 | 6/1888 | Great Britain. |

A. HARRY LEVY, *Primary Examiner.*